INVENTORS
LUTZ HORN
ROLF DIEBERG
FRITZ PHILIPP
SIEGFRIED DICKFELDT

AGENT

3,071,637
PROCESS OF PRODUCING POROUS, ELECTRICALLY CONDUCTIVE SHEET MATERIAL

Lutz Horn, Hagen, Westphalia, Rolf Dieberg, Dortmund-Aplerbeck, Fritz Philipp, Hagen-Haspe, and Siegfried Dickfeldt, Ennepetal-Milspe, Germany, assignors to Accumulatoren - Fabrik Aktiengesellschaft, Hagen, Westphalia, Germany, a company of Germany
Filed Jan. 27, 1960, Ser. No. 5,050
Claims priority, application Germany Jan. 27, 1959
9 Claims. (Cl. 136—36)

The present invention relates to a process of making a porous electrically conductive sheet material.

Various types of metallized paper and various processes of making such paper are known. For instance, thin metal foils have been rolled upon or applied by spraying to the supporting paper material. According to another known process, plastic fabrics or foils are coated with metals by means of vacuum deposition. It is also possible to coat paper with metals by means of cathode sputtering. For making metallized paper with a high porosity, very fine metal wires are interwoven or felted therewith.

All these processes, especially those which are suitable for the preparation of a highly porous metallized paper or fleece require great technical expenditures and are, therefore, quite expensive.

It is one object of the present invention to provide a porous, metallized sheet material which is especially suitable for the preparation of electrodes in electric cells such as for storage batteries, which has an especially high porosity as required for this purpose, and which at the same time has a high resistance to the corrosive influences to which such electric cells are exposed.

Another object of the present invention is to provide a simple and effective process of making such metallized sheet material which can be carried out without considerable technical expenditures and at a low cost and which permits the manufacture of the metallized sheet material in a continuous manner.

These and other objects of the present invention and advantageous features thereof will become apparent as the description proceeds.

These objects of the present invention are achieved by producing a porous metallized organic sheet material by heating solid organic materials in the form of fleeces or felts, such as cellulosic wadding, with the exclusion of air, so as to partly or completely carbonize such a material and to convert it into an electrically conducting framework, preferably of graphite, metallizing said structure at least on its surface and preferably throughout its entire cross-section, compressing the resulting porous, metallized electrically conductive sheet material, and sintering the metal whereby the sheet material is reenforced.

The framework of the metallized sheet material according to the present invention is preferably made from solid organic materials which have a fibrous structure, such as cellulose wadding or other fleece or felt materials. A preferred embodiment of the present invention consists in carrying out carbonization or, respectively graphitization of the organic material in an inert or reducing atmosphere.

It has been found to be especially advantageous to carry out the carbonization or, respectively, graphitization of the organic material in a vacuum.

According to a preferred embodiment of the present invention carbonization or graphitization of the organic material is effected at temperatures above 600° C. and preferably at temperatures between about 700° C. and about 900° C. Thereby a porous and electrically well conducting layer, preferably in the form of a fleece or felt is obtained. When continuing carbonization at temperatures of about 600° C. for a prolonged period of time, the initially formed coke is converted to a large extent into graphite so that a graphite fleece or felt is obtained which has a highly improved electrical conductivity and porosity and also a great mechanical strength.

If, for instance, pure cellulose in the form of a layer of wadding is treated according to the procedure described above, its volume which is rather considerable before the treatment, will shrink to a very thin cross-section of the layer. Its initial structure and the connection between the individual cellulose fibers, however, will be preserved. Such a graphite fleece has a sufficiently high strength and can be further processed in any desired manner, for instance, it can be rolled or folded. The resulting structure is then coated electrolytically or chemically with the desired metal coating. Since the fleece is very thin and, in addition thereto, also highly porous, all its fibers, both on the surface and in the interior, are covered with a metallic layer.

The strength and rigidity of the carbonized or graphitized and metallized sheet material is increased by subjecting it to compressing, rolling, and/or sintering. By such a subsequent treatment a metallized sheet material is produced which has very good mechanical strength properties and chemical resistance although its porosity has been reduced only to a small extent.

The process according to the present invention can also be carried out continuously in such a manner that a continuous sheet of the carbonizable organic material is passed through a coking or graphitizing furnace and, thereafter, through one or more galvanic baths, in which it is provided with the desired metal coating. The metallized carbonized sheet material is then continuously subjected to rolling or sintering to improve the mechanical and chemical properties thereof.

The metallized sheet material according to the present invention is especially suitable for the preparation of electrodes of galvanic cells such as used in storage batteries. In order to prepare negative electrodes, the active metal, such as zinc, cadmium, iron, lead and the like is directly applied to the carbonized sheet material as described hereinabove. The active mass may be introduced in a manner known per se into the metallized sheet material according to the present invention. Positive electrodes are prepared in an analogous manner. Due to the elasticity of electrodes prepared in this manner, the advantage is achieved that they can be inserted into the cell in any desired form, for instance, in the form of a coil, whereby they exhibit the excellent properties of known sintered electrodes.

The porous metallized sheet material, however, is not only suitable for the preparation of electrodes for galvanic cells and storage batteries, but also for the preparation of electrodes of other electric cells, such as electrolytic condensers, barrier-type cells, electrolyzers, and the like.

The present invention is illustrated by the accompanying drawings representing microscopic enlargements (magnification in diameter: 300 times) of the fibrous material at various stages of treatment.

The following examples serve to further illustrate the present invention without, however, limiting the same thereto.

*Example 1*

Figure 1:
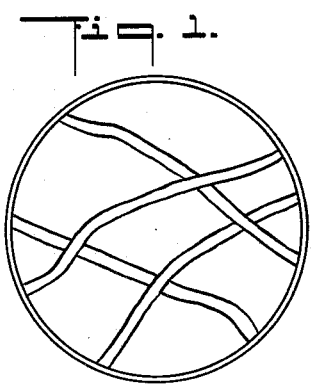
FIG. 1 shows cellulose fibers (wadding) as used for making the porous metallized sheet material according to the present invention.
Figure 2:
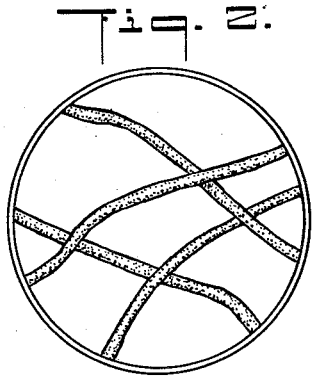
FIG. 2 shows the coked and partly graphitized fibers as they are obtained in the first step of the process according to the present invention (graphite fleece).
Figure 3:
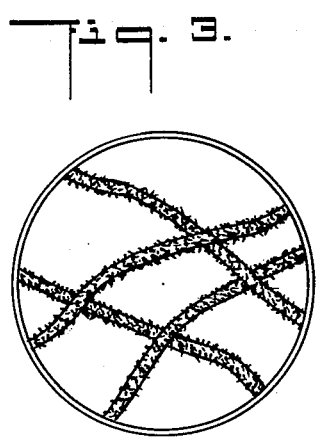
FIG. 3 shows the nickel plated graphite fleece as it is obtained in the second metallizing step.
Figure 4:
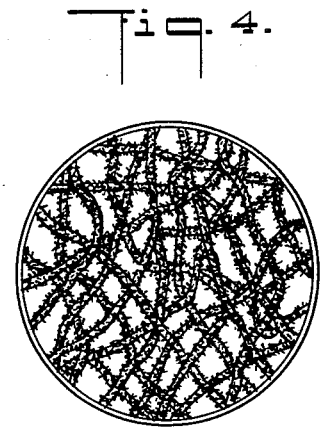
FIG. 4 shows the finished metallized sheet material, i.e. a nickel plated graphite fleece which has been sintered and strengthened by compressing and again sintering in the compressed state.

A cellulose wadding sheet of a thickness of 10 mm. (microscopic picture see FIG. 1) is heated in a muffle furnace in a vacuum of $10^{-5}$ mm. Hg at a temperature of 750° C. for 4 hours. The resulting carbonized sheet material corresponds in its appearance to that of FIG. 2.

*Example 2*

The same sheet material as used in Example 1 is continuously passed through an oven filled with nitrogen and is heated therein to a temperature of 800° C. The size of the oven and the speed with which the sheet material passes therethrough is such that carbonization takes place within 4 hours. The appearance of the carbonized sheet material under the microscope is about the same as that obtained according to Example 1.

*Example 3*

The vacuum-treated carbonized sheet material of Example 1 is electroplated with nickel in a bath containing the following ingredients:

| | |
|---|---|
| Nickel sulfate | g./l   240 |
| Nickel chloride | g./l    40 |
| Boric acid | g./l    30 |

The graphitized sheet serves as cathode and a sheet of pure nickel is used as the anode. The pH-value of the bath is between 4.0 and 6.0 and the temperature during electrolysis 45–55° C. The current density is about 0.2 amp. per sq. dm. Electrolysis is discontinued as soon as 10 g. of nickel per sq. dm. of sheet area are deposited. The sheet is then sintered under hydrogen at 900° C. for 60 minutes. The sintered sheet is passed through a pair of rollers in order to compress it, and again sintered at 900° C. for 1 hour. The resulting compressed and sintered sheet is useful as anode in a nickel cadmium cell for storage batteries.

*Example 4*

A cellulose sheet graphitized under nitrogen as described in Example 2 is electroplated with cadmium in a bath containing the following ingredients:

| | |
|---|---|
| Cadmium sulfate | g./l   200 |
| Ammonium sulfate | g./l    30 |
| Furfurol | g./l     1.5 |

The graphitized sheet serves as cathode and a sheet of pure cadmium is used as anode. The pH-value of the bath is between 4.0 and 5.0, the temperature 40–50° C. The current density is about 2 amps. per sq. dm. Electrolysis is discontinued when 8 g. cadmium per sq. dm. of sheet area are deposited. The sheet is then passed through a pair of rollers in order to compress it. The resulting metallized sheet can be used as cathode in a nickel-cadmium storage battery.

*Example 5*

A cellulose wadding sheet graphitized under hydrogen as described in Example 1 is electroplated with silver in a bath containing the following ingredients:

| | |
|---|---|
| Silver cyanide | g./l    30 |
| Sodium cyanide | g./l    30 |
| Sodium carbonate | g./l    38 |

The graphitized sheet serves as cathode and a sheet of pure silver is used as anode. The current density is 0.4 amp./sq. dm. The temperature during electrolysis is 24–28° C. Electrolysis is completed as soon as 15 g. of silver per sq. dm. of sheet area have been deposited. The resulting metallized sheet is then compressed and sintered for 60 minutes at a temperature of 500° C. in a nitrogen atmosphere. The metallized sheet is used as electrode in a silver-cadmium storage battery.

In place of cellulose wadding as used in Examples 1 and 2, there may be employed any other kind of cellulosic fleece or felt material, wool fleece or felt, paper of a high degree of porosity, paper pulp.

*Example 6*

A layer of medicinal cotton wadding is placed between two ceramic plates and is heated in a muffle furnace in a hydrogen atmosphere at a temperature between about 800° C. and 900° C. for 3 hours until coking is completed. Thereby, the thickness of the wadding layer is reduced to about 15% of its initial volume while the weight decreases to about 25% of its initial weight. Such a coked wadding can be heated in a Bunsen flame to red heat without bursting into flame. This proves that at least the surface of the cotton fibers is substantially graphitized. The electric resistance of such a coked wadding, when placed between two electrodes arranged at a distance of 10 mm. from each other, amounts to between about 20 ohms and about 25 ohms. This value is sufficient for the subsequent electroplating treatment.

Nickel-plating of such wadding of the dimensions 160 mm. x 80 mm. x 1 mm. is carried out in a glass vessel wherein 600 g. of commercial nickel salt as it is used for electroplating are dissolved in 3 liters of water. The bath contains two nickel sheet anodes of the corresponding size. The coked wadding is clamped in two aluminum frames which serve as current conductors and is suspended in the nickel salt bath between the two nickel anodes. Nickel anodes as well as the aluminum frames with the coked wadding are mounted in and supported by a plastic frame. Nickel-plating is then effected with a current density of 0.2 amp./sq. dm. Thereby not only the geometrical surface must be taken into consideration but also the total surface of the wadding because nickel-plating should also take place within the wadding. For instance, 1 g. of coked wadding obtained according to the above described method has a total surface of 720 sq. cm./g.

Electroplating is completed within about 8 hours. The thickness of the nickel precipitate on the fibers of the wadding is about $15\mu$. After nickel-plating, the wadding is washed with water and dried. In order to increase its mechanical strength the nickel-plated felt is subjected to a pressure of 200 kg./sq. cm. between two metal plates and is then sintered at 900° C. in a hydrogen atmosphere for 2 hours. This treatment imparts to the nickel-plated coked wadding such a strength that it can be bent and/or rolled. It pore volume is about 70% to 75%. When using such nickel felts as framework or grid for the active mass in alkaline storage batteries, the active mass is introduced, for instance, by electrolytic precipitation in a known manner into the wadding.

It is also possible to effect simultaneous nickel-plating of two coked felts by placing a sieve of nickel wire between the two felts.

Of course, many changes and variations in the starting fibrous fleece or felt material, in the carbonizing and graphitizing conditions, in the coating and electroplating of the carbonized sheet material with metal, in the further processing steps such as sintering, compressing, and the like may be made by those skilled in the art in accordance with the principles set forth herein and in the claims annexed hereto.

We claim:

1. In a process of producing porous, electrically conductive sheet material, the steps which comprise heating a fleece-like fibrous organic sheet material with the exclusion of air to carbonizing temperature to cause, at least partly, carbonization of the fibers of said sheet material, precipitating a metal coating on the surface of at least the surface fibers of the resulting at least partly carbonized fibers, compressing the resulting porous, metallized, electrically conductive sheet material, and sintering the metal coatings whereby the sheet material is reenforced.

2. The process according to claim 1, wherein the fibrous organic sheet material is a cellulosic fleece-like material.

3. The process according to claim 1, wherein heating is continued until the organic fibrous material is graphitized.

4. The process according to claim 1, wherein the metal coating is precipitated on all the fibers of the sheet material.

5. The process according to claim 1, wherein heating is effected in a vacuum.

6. The process according to claim 1, wherein heating is effected in a reducing atmosphere.

7. The process according to claim 1, wherein heating is effected in an inert atmosphere.

8. The process according to claim 1, wherein the fibrous organic sheet material is heated to a temperature of at least 600° C.

9. The process according to claim 1, wherein the fibrous organic sheet material is heated to a temperature between about 700° C. and about 900° C.

References Cited in the file of this patent

UNITED STATES PATENTS

| 378,258 | Mace | Feb. 21, 1888 |
| 2,088,422 | Kemmer | July 27, 1937 |
| 2,610,220 | Brennan | Sept. 9, 1952 |
| 2,636,916 | Licharz | Apr. 28, 1953 |
| 2,865,973 | Hartman | Dec. 23, 1958 |

FOREIGN PATENTS

| 757 | Great Britain | of 1893 |
| 2,776 | Great Britain | of 1882 |
| 153,566 | Australia | Oct. 9, 1953 |